United States Patent [19]

Egri et al.

[11] 4,396,877
[45] Aug. 2, 1983

[54] REVERSIBLE ELECTRIC DRIVE WITH BIDIRECTIONAL BACK-CURRENT BRAKE AND FED BY A RECTIFIER SUPPLIED FROM ALTERNATING CURRENT MAINS, PREFERABLY FOR MOTOR ARC FURNACE REGULATORS

[75] Inventors: János Egri; Gyöorgy Kucsera, both of Budapest, Hungary

[73] Assignee: Kohászati Gyárepitó Vállalat, Hungary

[21] Appl. No.: 246,477

[22] Filed: Mar. 23, 1981

[30] Foreign Application Priority Data

Apr. 9, 1980 [HU] Hungary ................................. 852

[51] Int. Cl.³ .............................................. H02P 5/40
[52] U.S. Cl. .................... 318/261; 318/258; 318/380
[58] Field of Search ............... 318/258, 261, 269, 367, 318/368, 375, 376, 379, 380

[56] References Cited

U.S. PATENT DOCUMENTS 3,463,991  8/1969  Yuminaka et al. ................. 318/258
4,329,630  5/1982  Park .................................... 318/258

Primary Examiner—J. V. Truhe
Assistant Examiner—A. Evans
Attorney, Agent, or Firm—McGlew and Tuttle

[57] ABSTRACT

A reversible electric drive with bidirectional back-current brakes fed by a rectifier supplied from a pair of A.C. power lines for a D.C. motor having two directions of rotation and two poles, comprises a control rectifier bridge for each direction of rotation, each bridge having two branches each containing a diode which is common to both bridges, a shunt resistor for each direction of rotation which is identical with a braking resistor for each other direction of rotation connected in series with the motor for each bridge, each bridge having two other branches each containing a rectifier thyristor with cathodes of each rectifier thyristor connected to a common point. The common point of each bridge is connected to one of the poles of the motor with a control thyristor connected to each common point in series with each respective shunt resistor of each bridge and connected to each other by a connecting point. The common diode is connected to the connecting point, and a braking thyristor is provided between a connecting point of each braking thyristor is provided between a connecting point of each shunt resistor and its respective control thyristor and the common points respectively.

6 Claims, 4 Drawing Figures

R₁ shunt resistor  
R₂ braking resistor

R₁ braking resistor  
R₂ shunt resistor

I. rotation in direction
II. rotation in direction

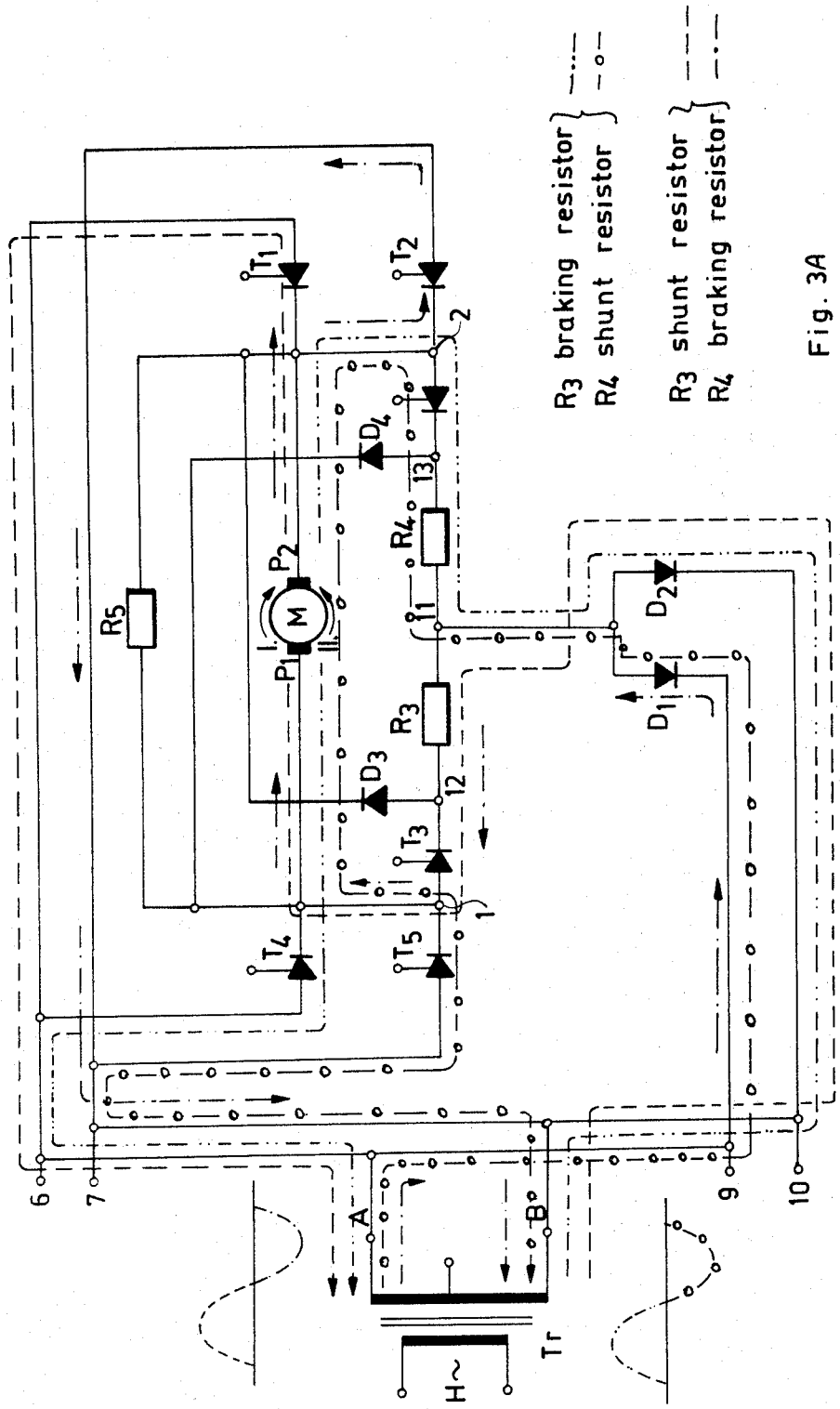

REVERSIBLE ELECTRIC DRIVE WITH BIDIRECTIONAL BACK-CURRENT BRAKE AND FED BY A RECTIFIER SUPPLIED FROM ALTERNATING CURRENT MAINS, PREFERABLY FOR MOTOR ARC FURNACE REGULATORS

FIELD AND BACKGROUND OF THE INVENTION

This invention relates to a reversible electric drive with bidirectional back-current brake which is fed by a rectifier supplied from alternating current mains and operated with an electric series-wound motor.

The electric drive according to the present invention can be applied advantageously in an apparatus regulating the volume of energy fed into electric arc furnaces, where the drive serves to move an electrode clamp up and down.

The advantages of electric drive regulators with rectifiers lie in that the voltage fed onto the poles of the motor—and thereby the rotation rate thereof—can be regulated infinitely variably without inserting a mechanical contact. High speed electronic components can be used, therefore the time constant of the system is determined solely by the motor. The use of electronic components also results in lower maintenance requirements, the use of no mechanical components which results in a higher reliability.

The electric drives are generally constructed with thyristor-bridge rectifiers. Concerning the number and placement of the thyristors, there are several known arrangements. One of them consists of four thyristors connected in a full-controlled bridge, in which the motor is placed in the diagonal thereof. In order to reduce the effects of overvoltages, resistors, inductances or RC-networks are inserted in series with the motor. For the sake of lower costs, half-controlled bridges containing two thyristors and two diodes have been constructed, wherein the thyristors are placed either symmetrically or asymmetrically. These bridges have the advantage that the duration of conductive state can be ideal, i.e. 180°. The braking of the motor is generally realized by means of braking resistors connected to the clamps of the motor, which can be switched thereto either when braking, or by means of braking resistors switched in continuously. The reversion is carried out by means of reversing the polarity of the voltage switched on the poles of the motor. For this purpose mechanical or contactless switches are used, or two parallelly connected rectifier bridges. The control signal is always fed into the component yielding a voltage corresponding to the rotation direction.

The complexity of the drive control electronics increases proportionally with the number of thyristors and the complexity of the task, consequently they are expensive and less reliable. On the other hand, in drives applied for arc furnaces the apparatus containing complex electronics can be used only together with auxiliary protective apparatus. Therefore the applied circuits are generally simple in construction. In these arrangements the braking resistor is—in order to abtain a short recovery time—fixed parallelly with the motor. The result is that the consumption is two to three times higher than the driver energy, as the wasted power is equal to or greater than the active power of the motor.

SUMMARY OF THE INVENTION

The object of the present invention is to provide a drive regulator which is simple, reliable and simultaneously strongly-built, the time constants of which necessary for regulation are realized with a minimal loss power, and which performs the necessary up-down drive together with braking operations necessary for accurate alignment.

The present invention relates to a reversible electric drive with bidirectional back-current brakes built-up of thyristors and diodes, fed by a rectifier supplied from alternating current mains, provided with a rectifier bridge and a direct current series-wound motor placed in the common diagonal of the two controlled rectifier bridges which is provided for braking in both directions with shunt resistors and switchable brake resistors. The inventive step is in that the branches of both controlled rectifier bridges containing diodes are common, and the shunt resistor for one direction of rotation is identical with the braking resistor for the other direction of rotation. This is realized in the circuit in such a way that common cathode points of the rectifier thyristors of both controlled rectifier bridges are connected to the poles of the motor, and two series members containing a resistor and a series-connected control thyristor each are connected to these common points. The connection point of said series members is the common point of both opposite connected control thyristors, and the common point of the two diodes forming the other branches of the bridge is connected to this point. Between the common points of the resistors and control thyristors and the common cathode points respectively, braking thyristors are inserted, one in each case.

In the case, where a galvanic isolation is required, the circuit can be constructed to contain a centre-tapped transformer, and the common point of both opposite-connected control thyristors is connected directly to the centre-point of the transformer without using diodes.

In another preferred embodiment of the electric drive according to the present invention, in the case of low power electric motors, the rectifier thyristors are connected to the mains either directly or via a transformer, and the cathodes of the rectifier thyristors are connected to the series-wound electric motor. The inventive idea lies in that to the poles of the motor common points of the cathodes of two rectifier thyristors are connected, the anodes of the control thyristors are connected to the same common points, whereby the cathode of each control thyristor is connected with a shunt resistor, the other ends of these shunt resistors are joined. The cathode of each control thyristor is connected via a protective diode with the anode of the other control thyristor. Furthermore, the joining point of the shunt resistors is connected via a diode either to the mains, or to the clamps of the transformer, or directly to the centre-tap of the transformer.

BRIEF DESCRIPTION OF THE DRAWINGS

The electric drive according to the present invention is further described by way of examples, and referring to the accompanied drawings, wherein:

FIG. 3A shows a simplified embodiment of the electric drive according to the invention wherein the circuit is supplied either directly from an AC line or via a transformer.

DESCRIPTION OF THE PREFERRED EMBODIMENTS

Figure 1:
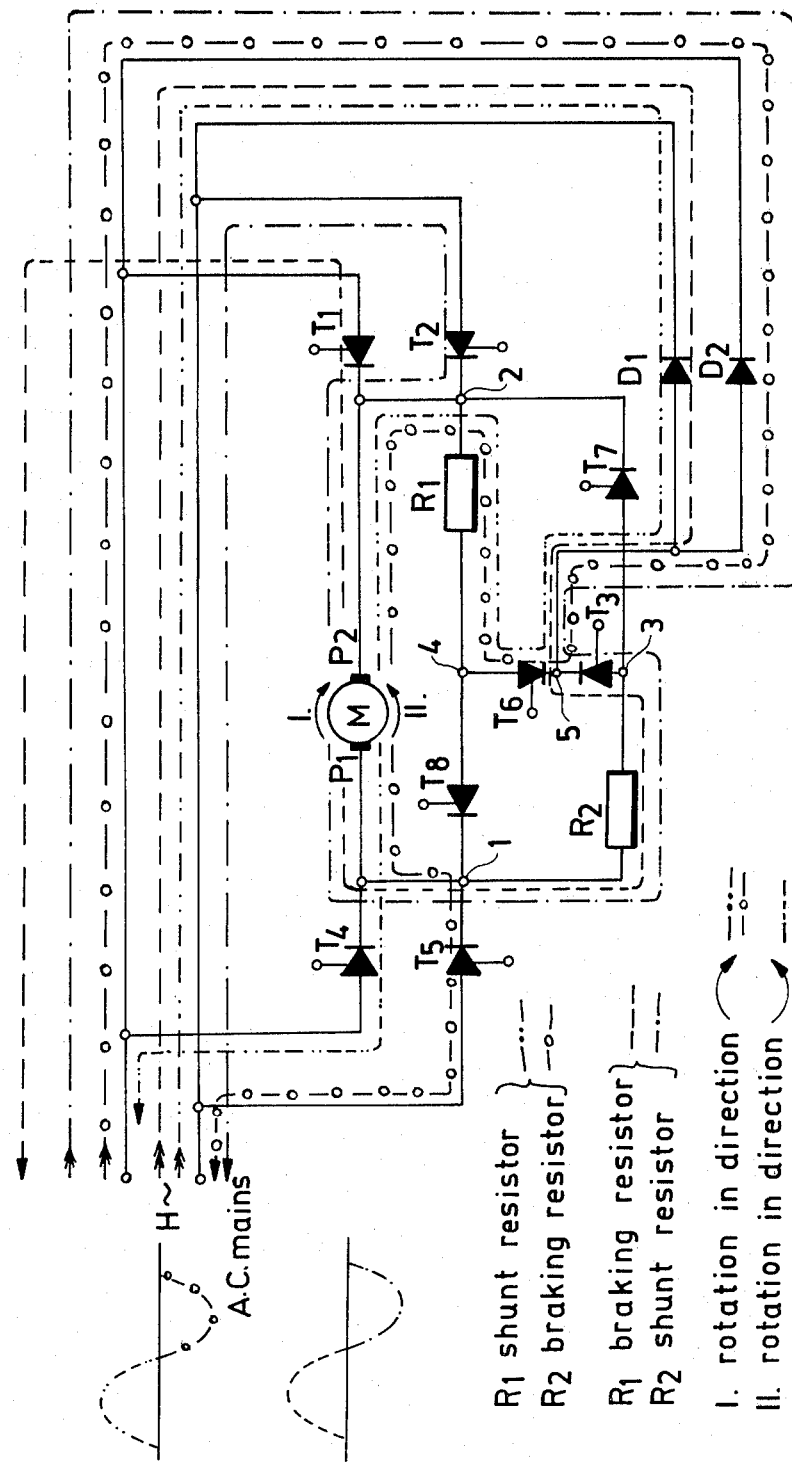
FIG. 1 shows the electric drive according to the invention.

Referring to FIG. 1, a circuit arrangement is shown wherein rectifier thyristors T1 and T2 of one of the controlled rectifier bridges and rectifier thyristors T4 and T5 of the other rectifier bridge are connected to the mains or AC lines H. The rectifier thyristors T1 and T2 at their cathode ends, are connected to a common point 2, and the rectifier thyristors T4 and T5 are connected to a common point 1. These common points 1 and 2 are connected to the poles P1 and P2 of the motor M which is a direct-current motor. Between the common points 1 and 2 two parallel connected series members are connected, the first of them consisting of a braking thyristor T8 and a resistor R1, the second consisting of a resistor R2 and a braking thyristor T7. The braking thyristor T8 has a common (anode) point 4 with the resistor R2, and the braking thyristor T7 with the resistor R2 forms a common point 3. Between the common anode points 3 and 4 two opposite-connected control thyristors T6 and T3 are connected, and diodes D1 and D2 are connected to the connecting (cathode) point 5 thereof. The other pins of the diodes D1 and D2 are connected to the alternating-current mains H.

The arrangement of the thyristor control electronic is well-known and has the function of providing an operating signal for the thyristors in the right moment.

As shown, the motor M is fed by two symmetrical half-controlled bridges. These bridges are of ideal 180°-conduction periods. The first controlled rectifier bridge for direction I consists of the rectifier thyristors T4 and T5 and diodes D1 and D2. Similarly, the second controlled rectifier bridge for direction II consists of the rectifier thyristors T1 and T2 and of the same diodes D1 and D2.

The resistor R1 is a shunt resistor for direction I, whereby the resistor R2 is the braking resistor for the same direction I. In the case of reversed rotation in direction II, the function of both resistors are reversed, i.e. resistor R2 will be the shunt resistor and resistor R1 the braking resistor. The direction of rotation is selected by means of switching in the appropriate controlled rectifier bridge and one of the control thyristors T3 and T6 respectively. The braking can be effected by inserting the braking resistor by means of the braking thyristors T7 and T8. The speed of the drive can be controlled by means of varying the angle of current flow via the rectifier thyristors T4, T5 and T1, T2 respectively, varying thereby the volume of direct (D.C.) voltage appearing on the poles P1 and P2.

The reversible electric drive according to the present invention operates as follows (see FIG. 1):
In order to rotate the electric drive in direction I, the thyristors T4 and T5 are controlled by means of signals providing an angle of flow corresponding to the required rotating rate or revolution number, then opening the control thyristor T6 the current flowing via the resistor R1, which acts as a shunt resistor, and causes the motor to rotate. The current pathways are shown by the double-dot and circle chain lines.

In the case, when the rectifier thyristors T4 and T5 are switched off, the motor is in idle running. The motor is braked by means of an opening signal fed onto the braking thyristor T7, since then the resistor R2 is connected across the poles P1 and P2 of the motor M, and the motor M is braked by the electric power generated by the motor M and transformed into heat energy on resistor R2, with a time constant determined by the values of resistor R2 and the inductance of the motor M.

In the case of a rotation in direction II, the rectifier thyristors T1 and T2, and the control thyristor T3 are supplied with an opening signal (dashed and single-dot chain lines), and the rotation is braked down by means of the resistor R1 by switching in the braking thyristor T8.

It is easy to see that a controllable rectifier bridge is provided for each direction of rotation having common branches of diodes, at the same time the shunt resistor for one direction of rotation is identical with the braking resistor for the other direction of rotation and vice versa. This circuit arrangement has a simple construction, the braking resistors thereof are switched in only during the time of braking, and at the same time the mode of using the resistors alternately as braking or as shunt resistors means a significant simplification. This solution is advantageous in that the relative high power motor can be operated with an energy consumption not higher than necessary and with a rapid braking with resistors.

Figure 2:
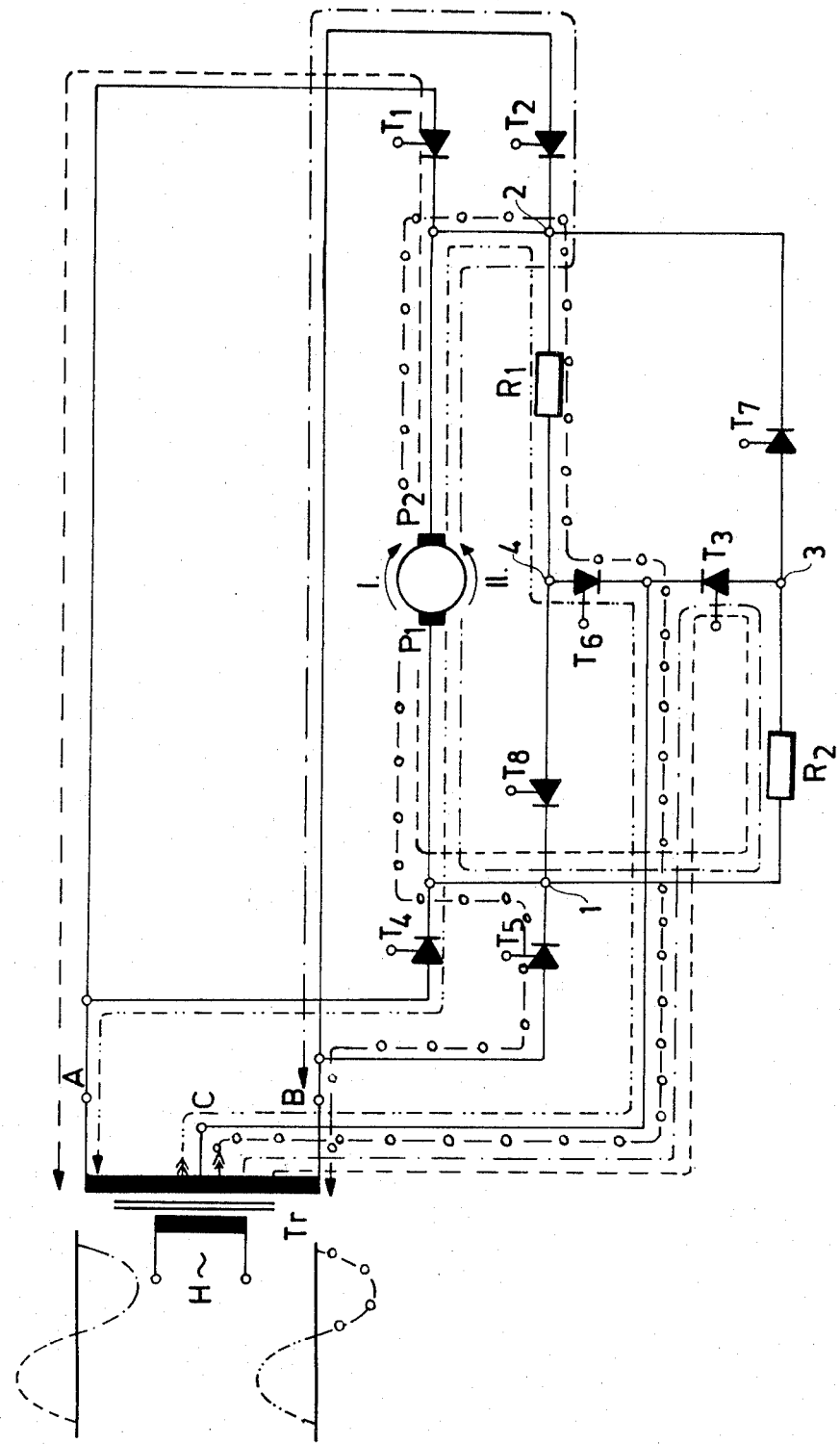
FIG. 2 shows a preferred embodiment of the electric drive according to the invention with a transformer.

There are application fields where the galvanic isolation of the motor from the supplying alternating-current mains is an essential requirement. In this case an isolator transformer should be used where the drive according to the present invention is connected to the clamps of the transformer rather than to the mains H. By using a transformer the drive control circuit can be simplified in some respect, namely that a centre-tapped transformer Tr is used and the control thyristors T6 and T3 are connected directly onto the centre-tap C of the transformer Tr rather than via diodes. This arrangement is shown in FIG. 2. The mode of operation and control of this circuit is completely identical with that of the circuit arrangement shown in FIG. 1, the only difference is in the mode of application of the half-bridge.

The electric drives according to the present invention can be used advantageously both for small power and high power motors.

In another preferred embodiment of the electric drive according to the present invention the circuit arrangement can be further simplified for direct current motors of smaller power (less than 2 kW) in the manner that a braking resistor is used which is continuously switched in, whereby two thyristors can be omitted.

In the case of this preferred embodiment of the electric drive according to the present invention which can be used preferably for electric motors of smaller power, the braking resistor for one direction of rotation is not identical with the shunt resistor for the other direction of rotation—as was the case in the example above—but the braking resistor is connected parallelly with the motor over all the operation. In accordance with this, the motor should be driven from greater power supply voltage. Considering that the value of the braking resistor is approximately between half and quarter the value of the shunt resistors. The fact that this resistor is continuously switched in the circuit does not alter the power consumption characteristics of the drive for the worse. On the other hand the simplicity and low costs of the solution makes it reasonable for smaller power requirements.

Figure 3B:
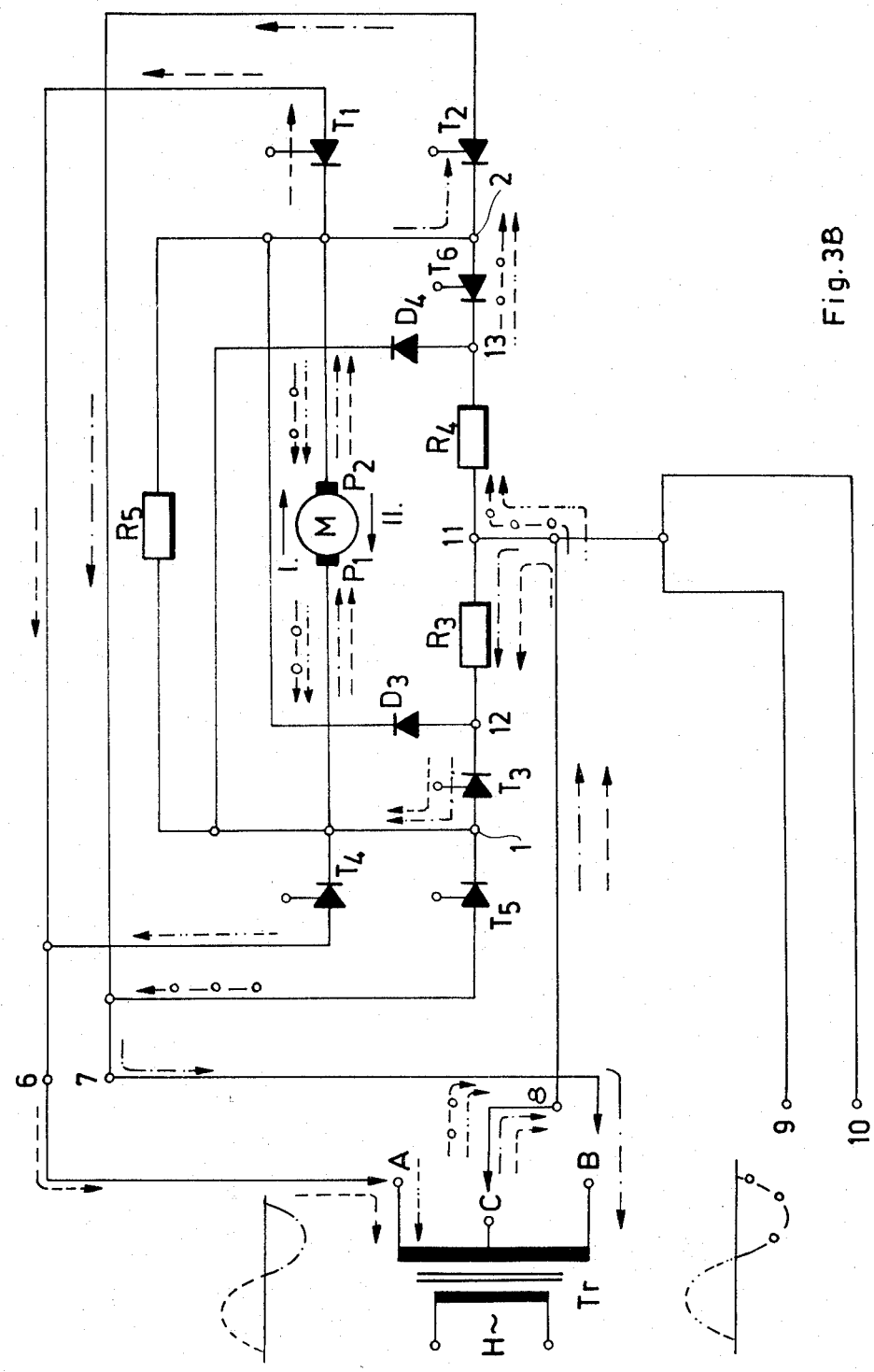
FIG. 3B shows a circuit which is supplied from a mid-tap transformer.

The preferred embodiment of the electric drive described above is shown in FIGS. 3A and 3B. The circuit arrangement according to the present invention is connected to the alternating-current mains H either directly or via the transformer Tr.

In the first case (FIG. 3A), that is, when the circuit arrangement according to the present invention is connected directly to the mains H, the rectifier thyristors T4, T5 and T1, T2 respectively, and the diodes D1, D2 as well are connected directly onto the mains H, that is, the clamps 6, 7 and 9, 10 respectively are connected onto the mains. Of course, the circuit arrangement described above can also be connected onto the mains H via a transformer, in this case the clamps 6,7 and 9, 10 are connected to the clamps A and B of the transformer Tr. In this solution, however, the circuit arrangement can be simplified in the way that the diodes D1 and D2 are omitted (FIG. 3B), and instead of them the clamp 11 is connected to the centre-tap C of the secondary coil of the transformer Tr.

Inside the circuit, the braking resistor R5 is connected across the poles P1 and P2 of the motor M. Besides the motor M and braking resistor R5, thyristors T3 and T6 are also connected to the commoning points 1 and 2 at their anodes, which are connected to the rectifier thyristors T1, T2 and T4, T5 respectively. The shunt resistors R3 and R4 are connected in series with the control thyristors T3 and T6. The common point 11 of the shunt resistors R3 and R4 is connected either directly to the clamp 8, or via the diodes D1 and D2 to the clamps 9 and 10. In order to reduce the transient effects and to realize a braking circuit, shunt diodes D3 and D4 are connected between the common points 12, 13 and the commoning points 1 and 2.

The apparatus is operated by means of a control unit not shown here. In the case of rotation in one direction, the rectifier thyristors T1 and T2 and the control thyristor T3 as well are supplied with an opening signal, and the current flowing via the shunt resistor R3 through the motor M operates the motor M with a rotation number determined by the resistance of the shunt resistor R3 and terminal voltage. The shunt resistor R3 determines the maximal number of the revolution. In the case of rotation in the other direction, the rectifier thyristors T4 and T5 and the control thyristor T6 are supplied with an opening signal, and then the maximal number of the revolution is determined by the shunt resistor R4.

In the case of braking, the energy stored in the motor is consumed by the diodes D3 and D4 and the braking resistor R5 as well, when the motor is driven in any direction of rotation, the shunt diodes D3 and D4 get a closing voltage, therefore said diodes do not conduct, but when braking, the power supply voltage is interrupted, and said diodes D3 and D4 are supplied with the voltage induced by the motor M, upon which the diode of the corresponding direction will conduct permitting by this the consumption of the energy induced by the motor M. The continuously switched-in braking resistor R5 does not load the power supply source, as its value is the quarter or at the most the half of the values of the shunt resistors R3 and R4, and hence not the entire motor-current flows via this resistor, it may be of less Watt-number.

It is obvious from the above description that the circuit arrangements according to the present invention are—besides their favorable operational characteristics—simple, cheap and robust in the construction, therefore they meet the special requirements of metallurgical works regarding both the safety of operations and price. These electric drive circuits, as a consequence of their low price, reduce the price of the motor arc furnace regulators in a great extent, furthermore, having good control technic characteristics, an improvement in the control technic parameters of the apparatus means a better competitiveness in the market of the motor arc furnace regulators.

What we claim is:

1. A reversible electric drive with bidirectional back-current brakes fed by a rectifier supplied from a pair of A.C. power lines, for a D.C. motor having two directions of rotation and two poles, comprising a control rectifier bridge for each direction of rotation, each bridge having two branches each containing a diode which is common to both bridges, a shunt resistor for each direction of rotation which is identical with a braking resistor for each other direction of rotation connected in series with the motor for each bridge, each bridge having two other branches each containing a rectifier thyristor with cathodes of each rectifier thyristor connected to a common point, said common point of each bridge connected to one of said poles of the motor, a control thyristor connected to each common point in series with each respective shunt resistor of each bridge and connected to each other by a connecting point, said common diode being connected to said connecting point, and a braking thyristor between a connecting point of each shunt resistor and its respective control thyristor and said common points respectively.

2. A reversible electric drive with bidirectional back-current brakes fed by a rectifier supplied from a pair of A.C. power lines, for a D.C. motor having two directions of rotation and two poles, comprising, a main transformer having two clamps and a centre-tap, a controlled rectifier bridge for each direction of rotation, each bridge having two branches each containing a rectifier thyristor, an anode of one rectifier thyristor in each bridge connected to one of said clamps and an anode of each other rectifier thyristor in each bridge connected to the other clamp, the cathode of each rectifier thyristor in each bridge connected at a common point for each bridge, the common point of one bridge connected to one of said motor poles and the common point of the other bridge connected to the other of said motor poles, a resistor having one end connected to each common point and an opposite end, a braking thyristor for each bridge having a cathode connected to a common point of the other bridge and an anode connected to the other end of each resistor respectively, a pair of opposite connected control thyristors having common connected cathodes which are connected to the centre-tap of said transformer, with an anode of each control thyristor connected to the other end of each resistor respectively.

3. A reversible electric drive with bidirectional back-current brakes fed by a rectifier supplied from a pair of A.C. lines for a D.C. motor having a pair of poles, comprising a first pair of rectifier thyristors each having a cathode connected to one motor pole, a second pair of rectifier thyristors each having a cathode connected to the other motor pole, at least two series connected shunt resistors each resistor connected in series with the motor and at least one parallel connected braking resistor connected in parallel with the motor, a pair of control thyristors each having an anode connected to one of said common points, a cathode of each control thyristor connected in series with said at least two shunt resistors, a protective diode connected between the cathode of each control thyristor and the anode of the other control thyristor, and a connecting point between said series connected shunt resistors connected operatively with said pair of A.C. power lines.

4. A reversible electric drive according to claim 3, including a transformer having a secondary coil with a first and second clamp operatively connected to the pair of A.C. power lines, said rectifier thyristors connected to one of said clamps.

5. A reversible electric drive according to claim 4, wherein said transformer coil has a centre-tap, said connecting point between said series connected shunt resistors connected to said centre-tap.

6. A reversible electric drive according to claim 4, including a second pair of diodes connected between said connecting point between said series connected shunt resistors and respective ones of said transformer coil clamps.

* * * * *